(12) United States Patent
Rudden et al.

(10) Patent No.: US 11,019,064 B2
(45) Date of Patent: May 25, 2021

(54) DATA SECURITY ACROSS DATA RESIDENCY RESTRICTION BOUNDARIES

(71) Applicant: INTERNATIONAL BUSINESS MACHINES CORPORATION, Armonk, NY (US)

(72) Inventors: Mary E. Rudden, Denver, CO (US); Karen Cheng, North York (CA); Thanh Lam, Fontana, CA (US); Daniel S. Riley, Durham, NC (US); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 16/120,708

(22) Filed: Sep. 4, 2018

(65) Prior Publication Data

US 2020/0076811 A1 Mar. 5, 2020

(51) Int. Cl.
*H04L 29/06* (2006.01)
*G06F 21/62* (2013.01)

(52) U.S. Cl.
CPC ........ *H04L 63/102* (2013.01); *G06F 21/6218* (2013.01)

(58) Field of Classification Search
CPC .............. H04L 63/102; G06F 21/6218
See application file for complete search history.

(56) References Cited

U.S. PATENT DOCUMENTS

| | | | | |
|---|---|---|---|---|
| 7,047,241 | B1 * | 5/2006 | Erickson | ................. G06F 21/10 |
| 2009/0080408 | A1 * | 3/2009 | Natoli | ..................... H04L 49/35 |
| | | | | 370/351 |

(Continued)

OTHER PUBLICATIONS

Yaich et al., "User-centric management of security and dependability in clouds of clouds", IMT (2017), 48 pgs.

(Continued)

*Primary Examiner* — William S Powers
(74) *Attorney, Agent, or Firm* — William Hartwell; Matthew M. Hulihan; Heslin Rothenberg Farley & Mesiti PC

(57) ABSTRACT

Data security across data residency restriction boundaries is provided by profiling a dataset on which a desired analysis is to be performed, with some results of the desired analysis to be transferred from one location to another, the dataset subject to data residency restrictions that restrict transfer of the dataset across a boundary to the another location, and the profiling identifying a profile level for the dataset, automatically generating, based on the profile level and the data residency restrictions that restrict the transfer of the dataset across the boundary, a container for processing the dataset into a reformatted dataset not restricted by the data residency restrictions for transfer across the boundary, instantiating the generated container on a data processing system at the one location, and processing the dataset into the reformatted dataset using the instantiated generated container, and transferring the reformatted dataset to the another location.

20 Claims, 7 Drawing Sheets

(56) References Cited

U.S. PATENT DOCUMENTS

| | | | |
|---|---|---|---|
| 2012/0066517 A1* | 3/2012 | Vysogorets | G06F 21/6209 |
| | | | 713/193 |
| 2013/0091350 A1* | 4/2013 | Gluck | H04L 63/0471 |
| | | | 713/153 |
| 2016/0350173 A1 | 12/2016 | Ahad | |
| 2017/0372096 A1* | 12/2017 | Yousfi | G06F 21/6254 |
| 2018/0069834 A1 | 3/2018 | Angelsmark et al. | |
| 2019/0180052 A1* | 6/2019 | Barday | G06F 21/577 |

OTHER PUBLICATIONS

Fetzer, "Building critical applications using microservices." IEEE Security & Privacy 14.6 (2016): 86-89.

Schork et al. "Application of the holistic Data Privacy and Security Framework PaaSword: A focus on the integration in industrial Pilots." Proceedings of the 12th International Conference on Availability, Reliability and Security. ACM (2017), 10 pgs.

Mortier et al. "Personal Data Management with the Databox: What's Inside the Box?." Proceedings of the 2016 ACM Workshop on Cloud-Assisted Networking. ACM (2016), 7 pgs.

Ge et al. Blockchain for agriculture and food. No. 2017-112. Wageningen Economic Research (2017), 40 pgs.

Binkowski et al. "Securing 3rd Party App Integration in Docker-based Cloud Software Ecosystems." Cloud Computing 2018 (2018): 77-83.

Mell, Peter, et al., "The NIST Definition of Cloud Computing", NIST Special Publication 800-145, Sep. 2011, Gaithersburg, MD, 7 pgs.

* cited by examiner

DATA SECURITY ACROSS DATA RESIDENCY RESTRICTION BOUNDARIES

BACKGROUND

Data is easily shared from one locale to another in the global information landscape. There are an increasing number of legal ramifications that make sharing data across geographic, jurisdictional, political, and other types boundaries complex. The General Data Protection Regulation (GDPR) is legislation that addresses the export of personal data outside of the European Union (EU). The GDPR aims primarily to give control of personal data back to citizens and residents of the EU. Another example legislation is The Health Insurance Portability and Accountability Act (HIPPA), which requires the establishment of national standards for electronic health care transactions and national identifiers for providers, health insurance plans, and employers. There are various other legislative and geo-political restrictions on handling of data that demand adherence because of the monetary and other penalties incurred for violations.

One challenging aspect to identifying and protecting sensitive data, such as personally identifiable information (PII), is how to deal with "unstructured" content, including documents or files on file shares, personal computing devices, and content management systems. These files, which may contain sensitive data subject to data residency restrictions, can be generated within and/or outside an organization, using many applications, can be converted to multiple file formats (commonly to PDF), and can seemingly have unlimited form and content. While the data or portions thereof may be subject to data residency restrictions such that their movement across a boundary is restricted, in many cases it is acceptable that the insights from data, when removed from the PII and other sensitive information, may be sent across such boundaries, even though the data itself may not.

SUMMARY

Shortcomings of the prior art are overcome and additional advantages are provided through the provision of a computer-implemented method. The method profiles a dataset on which a desired analysis is to be performed, with at least some results of the desired analysis to be transferred from one location to another location. The dataset is subject to data residency restrictions that restrict transfer of the dataset across a boundary to the another location, and the profiling identifies a profile level for the dataset. The method also automatically generates, based on the identified profile level for the dataset and the data residency restrictions that restrict the transfer of the dataset across the boundary, a container for processing the dataset into a reformatted dataset that is not restricted by the data residency restrictions for transfer across the boundary to the another location. The method instantiates the generated container on a data processing system at the one location, processes the dataset into the reformatted dataset using the instantiated generated container, and transfers the reformatted dataset to the another location. The method has an advantage in that it provides an automated system for cross-geography analytics such that sensitive information remains within the restricted boundaries and only output that is appropriate for sending across data residency restriction boundaries is shared. The method has another advantage in that it automatically produces containers, which may be reusable, to the necessary prerequisites and the artifacts (such as data descriptor language) for facilitating the data security across data residency restriction boundaries.

Further, a computer system is provided that includes a memory and a processor in communication with the memory, wherein the computer system is configured to perform a method. The method profiles a dataset on which a desired analysis is to be performed, with at least some results of the desired analysis to be transferred from one location to another location. The dataset is subject to data residency restrictions that restrict transfer of the dataset across a boundary to the another location, and the profiling identifies a profile level for the dataset. The method also automatically generates, based on the identified profile level for the dataset and the data residency restrictions that restrict the transfer of the dataset across the boundary, a container for processing the dataset into a reformatted dataset that is not restricted by the data residency restrictions for transfer across the boundary to the another location. The method instantiates the generated container on a data processing system at the one location, processes the dataset into the reformatted dataset using the instantiated generated container, and transfers the reformatted dataset to the another location.

Yet further, a computer program product that includes a computer readable storage medium readable by a processing circuit and storing instructions for execution by the processing circuit is provided for performing a method. The method profiles a dataset on which a desired analysis is to be performed, with at least some results of the desired analysis to be transferred from one location to another location. The dataset is subject to data residency restrictions that restrict transfer of the dataset across a boundary to the another location, and the profiling identifies a profile level for the dataset. The method also automatically generates, based on the identified profile level for the dataset and the data residency restrictions that restrict the transfer of the dataset across the boundary, a container for processing the dataset into a reformatted dataset that is not restricted by the data residency restrictions for transfer across the boundary to the another location. The method instantiates the generated container on a data processing system at the one location, processes the dataset into the reformatted dataset using the instantiated generated container, and transfers the reformatted dataset to the another location.

In some embodiments, the method also includes storing the generated container in a container registry wherefrom the stored generated container is available for selection and instantiation on a container host, which has an advantage that container may be reused where appropriate, saving additional processing and configuration. The method can check whether an appropriate container for processing the dataset into the reformatted dataset already exists in the registry, and automatically perform the generating the container based on determining that no appropriate container for processing the dataset into the reformatted dataset already exists in the registry.

In some embodiments, the instantiated generated container includes an input data volume for storing the dataset and an output data volume for storing the reformatted dataset, which has an advantage in that is compartmentalizes data which is safe to send across the boundary and data which is not safe to send across the boundary, which has an advantage in that the appropriate permissions, access, and purging of the data can be easily applied to the subject volume. The method can include generating a data definition language defining data structures to hold the reformatted dataset in the output data volume, which has an advantage in that it provides structure to potentially unstructured data, to facilitates desired analytics processing and data reformatting.

Generating the container can configure the generated container such that, based on terminating the instantiated generated container, data of the input data volume is lost, which has an advantage of avoiding mishandling of the input data (which is not to be provided across the boundary) after it has been reformatted for sending. Generating the container can configure the generated container such that the instantiation of the generated container includes restrictions that prevent extraction of data from the input data volume out of the instantiated generated container which has an advantage of avoiding mishandling of the input data (which is not to be provided across the boundary).

In some embodiments, the data processing system includes a server responsible for a database in which the dataset is stored, and the method further includes receiving a script by the data processing system and executing the script to perform the profiling and the identifying the profile level for the dataset based on identifying the another location and based on the data residency restrictions that restrict the transfer of the dataset across the boundary. This has an advantage of simplifying, centralizing, and keeping consistent the profiling of the data via a flexible script that can easily be adjusted as appropriate.

In some embodiments, the profiling classifies personally identifiable information of the dataset and determines the profile level for the dataset based on the classified personally identifiable information, and the reformatted dataset has the personally identifiable information removed or aggregated, such that the reformatted dataset does not include the personally identifiable information. This has an advantage in that it addressed the more common target (PII) for data residency restrictions.

In some embodiments, the generated container specifies executable code and dependencies to process the dataset into the reformatted dataset, and the processing the dataset into the reformatted dataset includes a portion of the desired analysis of the dataset, and the reformatted dataset includes the at least some results of the desired analysis for transfer to the another location. This has an advantage in that both the reformatting into an appropriate form for sending across the boundary and some of the desired analysis are performed at the same time by the same entity, rather than adding another layer of processing before sending.

In some embodiments, the desired analysis is to be performed by processing across the one location and a plurality of additional locations of which the another location is a part. A respective data processing system at each additional location of the plurality of additional locations can analyze respective intermediate data of the desired analysis. Respective data residency restrictions can apply to the intermediate data residing at the additional location and restrict transfer of the intermediate data from that additional location across a respective boundary to a next additional location of the plurality of additional locations. In this content, the method can further include automatically generating a respective container for each additional location of the plurality of additional locations. The generated respective container can be generated based on (i) an identified profile level of the intermediate data that is to reside at the additional location and on (ii) the data residency restrictions that restrict the transfer of the intermediate data to the next additional location. The generated respective container can be configured to receive the intermediate data for processing at that additional location, process the intermediate data into a reformatted intermediate dataset that is not restricted for transfer across the boundary to the next additional location, and transfer, to the generated respective container for the next additional location, the reformatted intermediate dataset as the respective intermediate data for analysis at that next additional location. This has an advantage in that it centralizes control over the processing to be performed in the various locations depending on the data residency restrictions at play and the desired analytics to be performed at each site.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
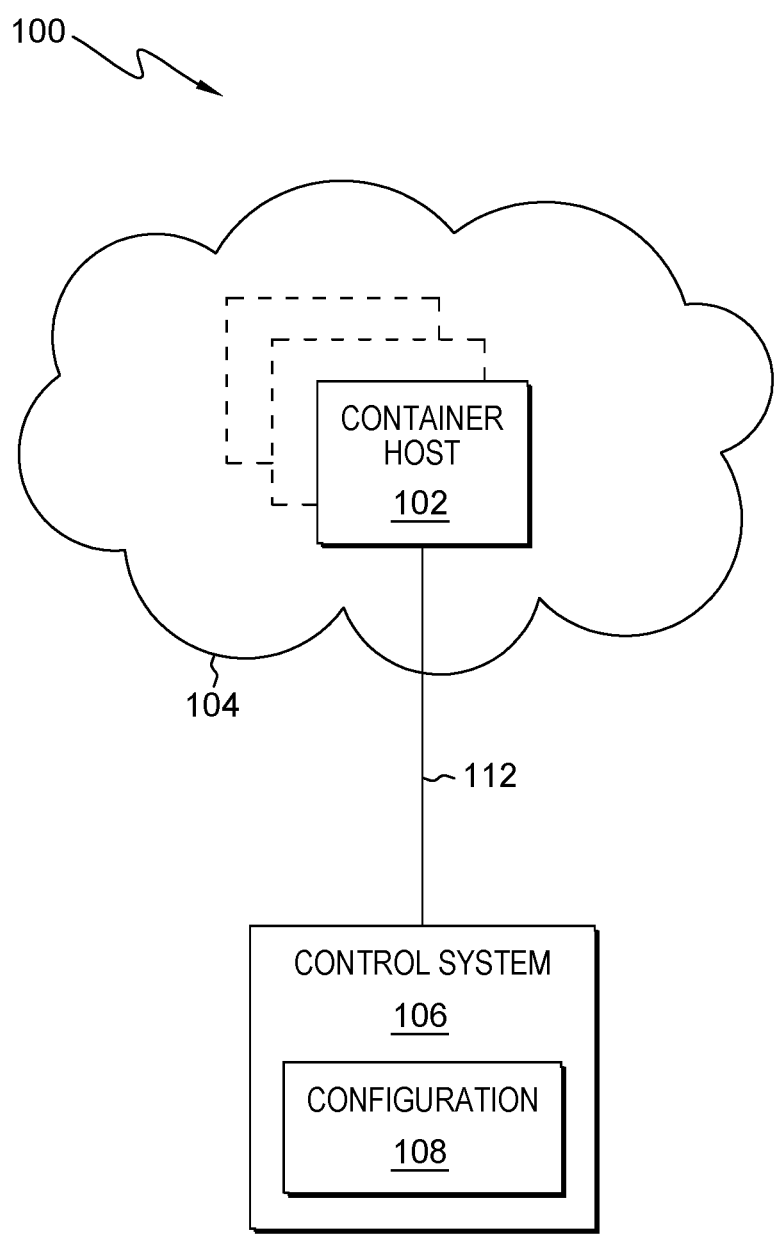
FIG. 1 depicts an example environment for execution of containers.

Aspects described herein provide approaches for data security across data residency restriction boundaries. Data residency restrictions, such as those put in place by legislation like GDPR, direct the retention within and movement across applicable boundaries.

One example type of data that is affected by data residency restrictions is global inventory management data. Inventory management can be critical to many large organizations, often encompassing millions of products across a complex global supply chain and ensuring that the right stock is at the right place at the right time. Up-to-date inventory management can be an in important factor in accurate demand forecasts, inventory, and replenishment plans across the global supply chain.

Structural complexity in global inventory management is due in part to the distribution of underlying systems across geographies. As often the case with the merging of data from disparate data systems, an initial stage of data preprocessing encompasses incomplete, down level, inaccuracies, and other undesired characteristics. In addition, multiple customer accounts and geographies involved may be subject to data residency restrictions that do not allow data to leave client premises and/or cross geographic, jurisdictional, political, or other boundaries.

Described herein is an automated construction of containers that can collect, appropriately process, and send inventory and other types of datasets where data residency restrictions exist. It is noted that while some aspects are described in the context of inventory data collection, management, and processing, aspects described herein are more broadly applicable to any kind of datasets across range of data analytics.

Containers are virtual environments providing portability to a set of encapsulated applications. Docker (offered by Docker Inc, San Francisco, Calif., U.S.A., of which DOCKER is a trademark), and Windows Containers (offered by Microsoft Corp., Redmond, Wash., U.S.A.) are two examples of container-based virtualization offerings. A container is instantiated from a generated container/container image by a container engine or host that provides a runtime environment for the image. Much like a virtual machine, a container can be stopped/paused and started when needed, though containers are generally lighter-weight than virtual machines.

In some aspects explained more specifically herein, processing by a set of containers is leveraged to achieve a desired analysis performed against dataset(s). The processing can occur across data residency restriction boundaries, for instance geographic or jurisdictional boundaries across which movement of data is regulated.

Typically, a control system accesses a generated container (which may be termed 'container image', and more generally provide a 'recipe' for the instantiation of a container having specific configurations and properties) and instantiates the generated container for execution. Each container may be custom generated based on, inter alia, the type of data it is to process, the geographic location of the data it is to process and location at which it is to execute, and the particular analysis/processing the container is to perform on a dataset. The desired tools, executables, supporting data, or the like, may be installed into and/or referenced by the generated container and available to the generated container when instantiated. Thus, each generated container may include the necessary .exe or other software to accomplish the specific tasks to which the container is directed, and in some examples the generated container need not include extraneous components. This allows the container image to remain relatively lightweight if desired. Meanwhile, the container may be relatively short-lived in terms of how long it remains started because it can be exited after it performs its part of the larger desired data analysis.

FIG. 1 depicts an example environment for execution of containers. Environment 100 includes container host(s) 102 providing facilities for at least container execution, and in some cases a repository/registry for generated containers. The container hosts 102 are in this example hosted in a cloud environment 104, though they may be hosted on any other type of network infrastructure, either local to a customer, client, or source data, or remote therefrom. A control system 106 communicates with the container hosts(s) 102 via the internet or other network connection(s) to manage the instantiation of generated containers on the container hosts from generated container images. In one example, the control system is a server responsible for a dataset that is subject to data residency restrictions and is to be analyzed. Results of such analysis may be for transfer to another location across a boundary of those data residency restrictions. By way of specific example, the control system may be a database (DB) server physically located in the European Union, GDPR may apply to the data in the database, and the sever may be to analyze and send results of the analysis to a server located in the United States. A registry of generated containers may be hosted in the cloud 104 or elsewhere. During container execution, the container(s) may call one or more external runtime services (not depicted) if desired.

The components in FIG. 1 form wired or wireless network(s) of devices, and communication between the devices takes place via wired or wireless communications links 112 for communicating data between the devices. FIG. 1 is just one example of an environment for execution of containers; many other examples are possible and contemplated as being compatible with the capabilities described herein.

The control system 106 in this example reads a configuration 108 that specifies or informs of generated container(s) to be instantiated to perform desired processing. Within the context of aspects described herein, the configuration may be informed based on executing a script to profile a dataset. The control system 106 identifies one or more generated containers to initiate their instantiation. The initiating the instantiation may be the sending of a call or other command from the control system 106 to a container host 102 or management system thereof. A call/command can direct the container host to instantiate the container in the container host from the generated container. The container host obtains, for instance, the container image from a repository local or remote to the container host. In some examples, the configuration 108 specifies parameters to use in instantiating one or more containers. Additionally or alternatively, the control system itself may be the container host, in which case the control system can pull an instance of a generated container and begin its execution.

Code and dependencies (runtime, scripts, tools, libraries, settings, etc.) can be packaged together in a container to allow for standardization and asset reuse. Containers are generally relatively lightweight and portable, secure, easy to maintain and easy to update.

Containers can be automatically constructed, with code and dependencies packaged together to provide standardization and reusability. This container generation strategy can be based on the dataset being analyzed and the geographic considerations/data residency restrictions in play.

Aspects leverage a script to profile the dataset to be analyzed. The script can be sent to and received by a source system, and analyze the data for analysis/transfer to another location (target). In a particular example, the source system is a particular server that is responsible for a database in which at least some of the dataset is stored.

The system can approach this profiling by the detection of sensitive data (e.g. PII) flags or cues. For example, the presence of "SS#", "Employee ID", or numerical patterns in certain formats (such as credit cards, phone numbers, addresses, etc.) can trigger a sensitive data flag. Severity of the sensitivity can also factor in. Regulations like GDPR can be complex, with differing restrictions depending on whether the data is to be shared only within the EU or additionally exported from the EU.

Thus, characteristics of the dataset, on which a desired analysis is to be performed, may be profiled. At least some results of the desired analysis may be for transfer from the source location to the target location. Running the script can provide determinations about how to properly handle the dataset and produce data (a 'reformatted dataset') that does not, or is confidently assumed to not, run afoul of the applicable data residency restrictions. By reformatted means having the data aggregated and/or removing data such that what remains is not restricted by the data residency restrictions for transfer across the boundary. The profiling by the script may be separate from the analytical processing that is to be performed against the dataset itself. Instead, in embodiments, the script is to inform the type of data that can be sent across the boundary and how to evaluate/analyze the current dataset so that results may be sent. Once it is understood what type of data is included in the dataset, then an evaluation can be made as to whether/how the relevant regulations apply to that data. The script can analyze the data can identify a profile depending on the proposed target(s) to which results are to be sent. The script may be sent to the source system by another entity, for instance one responsible for script building and maintenance. The source system can execute the script to perform the profiling of the dataset and the identification of the profile level for the dataset. It may also be based identifying the target location(s) to which data results are to be transferred and based on the data residency restrictions that restrict the transfer of the dataset across the boundary/boundaries involved.

It is noted that the data residency restrictions considered may be those that apply to the source location, one or more target location(s), and/or a combination of the foregoing. For instance, data residency restrictions may exist at the source location that restrict what type of data may be exported from that source location across the boundary to the target location, while no such data residency restrictions exist at the target location, or they may not be as restrictive at the target location. In this case, the dataset may be processed to obtain reformatted data that is allowed to be exported from the source location. Additionally or alternatively, data residency restrictions of the target location may restrict the types of data that are imported across the boundary from the source location. Either or both situations can inform the processing that is to occur at the source before the results of the data processing can be transferred to the target.

In particular examples, the profiling classifies personally identifiable information of the dataset and determines a profile level for the dataset based on the classified personally identifiable information. The reformatted dataset can have the personally identifiable information removed or aggregated, such that the reformatted dataset does not include the personally identifiable information. This may place the data into a (reformatted) form) that is legal to export from the source, legal to import and hose in the target, or both.

Based on the indicated profile level, the source system can generate a container. The container can be automatically generated based on the identified profile level for the dataset and the data residency restrictions that restrict the transfer of the dataset across the boundary. The container is for processing the dataset into a reformatted dataset that is not restricted by the data residency restrictions for transfer across the boundary to the target location and can specify executable code and dependencies to process the dataset into the reformatted dataset. This processing by the container can, if desired, also implement at least some desired analysis/analytics processing that is to be performed against the dataset, for instance for market or inventory analysis, or other insights.

There is a distinction made herein between container generation and container instantiation. Generation of a container, to produce a generated container, refers to scripting that specifies the appropriate configuration and characteristics of the desired container (accounting for privacy controls, operating system, security regulations depending on the type of data, etc.). A generated container can be instantiated, referring to the instantiation of a generated container according to the configuration and characteristics dictated by the generated container and for execution on a host. In some embodiments, the container is instantiated at the source location, for instance on the source system, though the container may instead be instantiated at any desired location. It is noted that data of the dataset to be reformatted into compatible form is to be processed by the container, so data residency restriction considerations may factor into where the container's execution is hosted.

Figure 2:
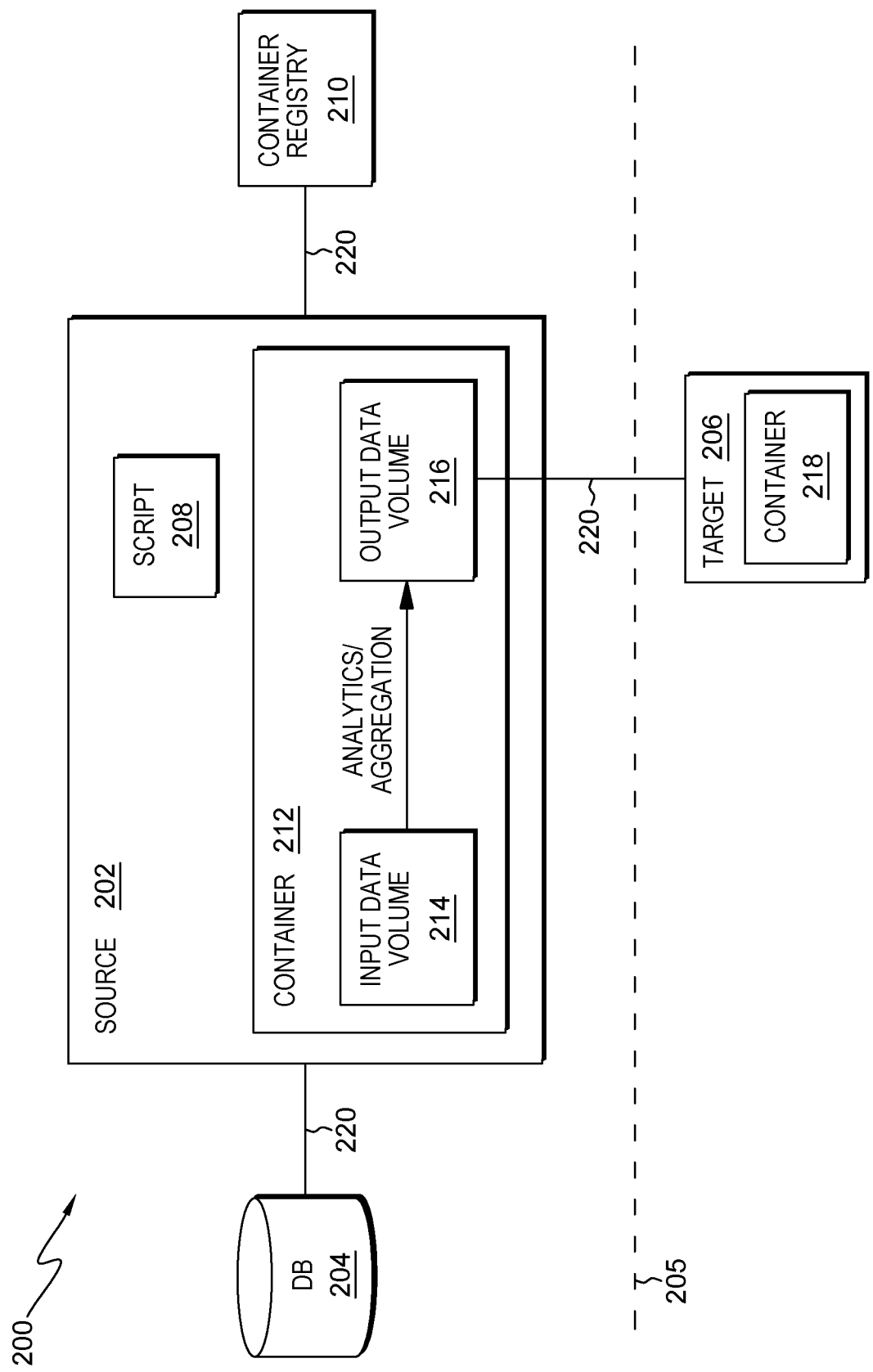
FIG. 2 depicts an example environment to incorporate and use aspects described herein.

FIG. 2 depicts an example environment to incorporate and use aspects described herein. Here, a source data processing system 202 resides in one (source) location and data in database 204 is to be transferred to target data processing system 206 residing in another (target) location. Boundary 205, corresponding to, e.g., a geographic boundary, exists between the two locations.

In this particular example, the data is to undergo analysis occurring at the source location. System 202 receives script 208 which executes to profile a dataset in database 204. The script informs of the profile level for the dataset based on identifying the target location and on the data residency restrictions that restrict the transfer of the dataset across the boundary 205. Based on this, source system 202 reaches out to container registry 210 to check whether a generated container already exists that is appropriate (perhaps with some tweaking) for the task of processing the dataset into a reformatted dataset. If not, the container registry 210, source server 202, another device, or some combination of the foregoing generates the container, which can then be stored in the registry 210. Then after, or if the container already existed and is pulled, the source server instantiates the generated container. In this example, the source server is also the container host and the container is instantiated on the source server. In other examples, the source server causes the container to be instantiated on a host, for instance a cloud host that is within the source location.

In the example of FIG. 2, the container 212 is instantiated on the source server 202 itself and runs thereon. The container includes input data storage/volume 214 and output data storage/volume 216. As described herein, the input data volume 214 can hold some/all of dataset from database 204 that is the subject of the data transfer. Appropriate processing, which can include desired analytics/aggregation, is performed by processing of the container 212. Output of that processing is placed in output data volume 216. The data placed in the output data volume may be the reformatted dataset that is not restricted by the data residency restrictions for transfer across the boundary 205. The data residency restrictions may be restrictions on the transfer of data out of the source location across boundary 205 to the target location. Alternatively, the restrictions may be restrictions on the import of data and/or storage thereof in the target location from the source location. As yet another example, the data residency restrictions may be combination of the two.

In any case, data in the output data volume 216 is the reformatted dataset that is permitted to be transferred across boundary 205 to the target location. The target system 206 includes in this example a container 218 into which the reformatted dataset is transferred. Communications links 220 are wired or wireless data communications paths for communicating data between the devices of FIG. 2.

If container 218 is itself configured to further process the received data (i.e. the reformatted dataset) into a next reformatted dataset, for instance because of data residency restrictions that might apply to target system 206's transfer of the data elsewhere, container 218 may include an input data volume into which the reformatted data is received from container 212, process the received reformatted data, and store the results to an output data volume of container 218 form which it can be transferred to a next location.

In this regard, container generation can follow a known geographic pattern. It may be that analytics is to be performed on data that is to cross through several different locations, potentially spanning different restricted geographies. Depending on the restrictions involved, a respective appropriate container for the appropriate analytics together with the appropriate data reformatting may be generated for each geographical boundary. Each container can be generated for each location based on (i) an identified profile level of the intermediate data that is to reside at the additional location and on (ii) the data residency restrictions that restrict the transfer of the intermediate data to some next location, and be configured to receive from a sequentially-prior location the intermediate data for processing at that location, process the intermediate data into a reformatted intermediate dataset that is not restricted for transfer across the boundary to the sequentially-next location, and transfer, to the generated respective container for the next location, the reformatted intermediate dataset as the respective intermediate data for analysis at that next location.

The source system 202 could coordinate and/or perform the container generation, the generation could be performed by another central component, or at each respective location, as examples. The generated containers could be distributed to or pulled down to the different points along the data route and instantiated when and where needed.

Therefore, in cases where analytics is to be performed on data crossing restricted geographies, multiple containers can be generated (or existing containers reused). In FIG. 2, the processing of the initial dataset (in DB 204) into the reformatted dataset held in output data volume 216 can be a portion of the overall desired analysis of the dataset. The reformatted dataset forms an intermediate set of results of that overall desired analysis.

Generated containers can be stored to a container registry (e.g. 210) and made available for selection and instantiation on container host(s). This can help eliminate redundancy in generating containers that may have already been generated. For instance, the same generated container could be reusable across several data analysis runs if only the data itself is being updated over time. If, for example, the database server's processing tasks/analytics is largely static across those runs, the server is to transfer to the same target location, and the data residency restrictions remain the same, then the appropriate container might already exist and the existing container scripts could be reused or used after relatively minor tweaking.

Figure 3:
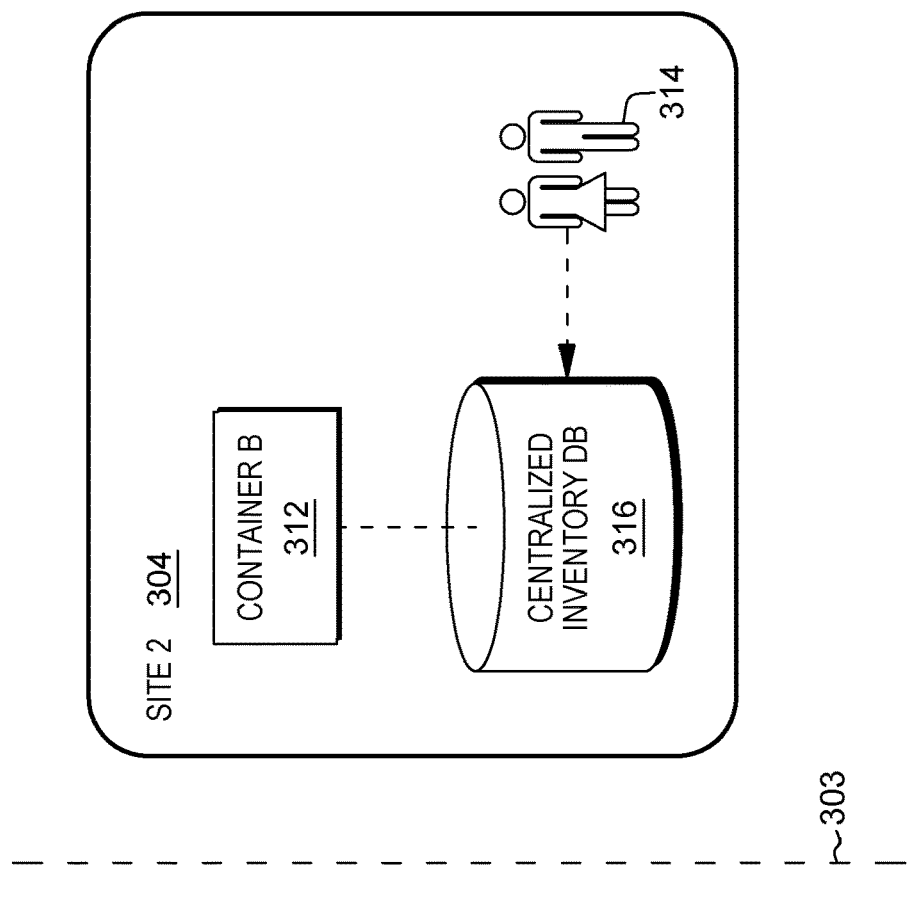
FIG. 3 depicts another example environment to incorporate and use aspects described herein.
Figure 3:
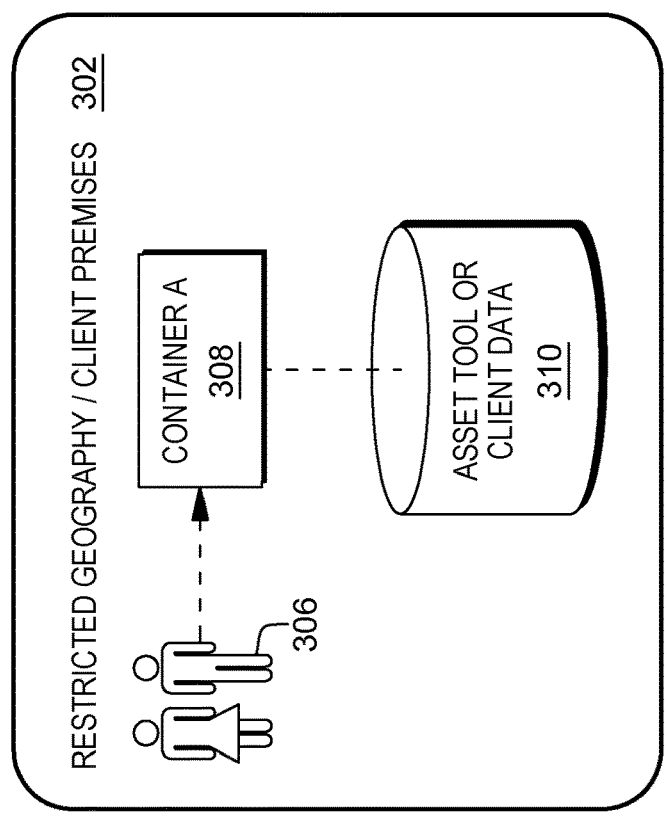

After the generated container is instantiated on the data processing system at the source location, the data processing system processes the dataset into the reformatted dataset using the instantiated generated container, and transfers the reformatted dataset to the target location. Additional details of an embodiment are provided with reference to FIG. 3, depicting another example environment to incorporate and use aspects described herein.

Source location 302 is a restricted geography/customer premises separated by boundary 303 from target location 304, which is a destination (site 2). Local administrator resources 306 deploy container A 308, which contains all code and dependencies (normalization scripts, stripping utilities, python libraries, etc. in this example) to process raw inventory data stored in the asset tool 310 as customer data. Scripting within container 308 processes the raw data into a standard format and sends a GDPR-friendly cleansed report to container B 312 at site 2 304 for aggregation and summary. The information is stored in centralized inventory database 316 for reporting purposes and access by entities 314, with data management and governance policies in place. Aggregate data can be sent back to container A if desired, for instance for purposes of audit control to prove that data has not been misused.

The generated first container (Container A) may be generated and stored in the container registry. The restricted geography 302 can pull an instance of this container for instantiation and processing to produce the report send to container B. All the code and dependencies may be associated to the host machine, allowing the team in the restricted geography to begin immediate processing.

In some examples, a volume in the container is used to store files in the host machine. The container can bind mount a file or directory on the host machine into the container and/or tmpfs mount a temporary filesystem in host system memory to avoid storing the data anywhere permanently. Additionally or alternatively, a volume can be mounted in the filesystem if desired.

The container can include (e.g. by way of reference-to) an input data storage/volume, and an output data storage/volume. The output data volume can represent the outcome/output of some analytics action. It may be possible to share the data from the output data volume across restricted geographies (varying based on analytics that were created).

Within the input data volume, the container's writable layer can be coupled directly to the host machine (e.g. a VM) where the container is running. This can make it difficult to move the data somewhere else.

Based on available options, data in the input volume can be made not to persist when that container is no longer running, and intentionally make it difficult for another process to extract the data out of the container.

Accordingly, aspects described herein can provide:
an automated system for cross-geography analytics such that sensitive information stays in host countries and only output appropriate for sending across data residency restriction boundaries is shared;
automated generation of containers;
automated generation of associated artifacts (such as Data Definition Language (DDL) and container compose files for linking multiple containers together. For instance, configurations of the operating systems for containers and specifications about how container input data volumes and container output data volumes work together to receive and provide data. Compose files can inform how the artifacts (DDL, input volume, output volume) interact. Various data linkages between containers can be specified by the automated generation of the compose files indicating how the three artifacts come together. Containers may be instantiated based on the container compose file. Included DDL can contain definitions of what the data tables in the input and output data volumes look like;
automated analysis of PII for the generation of containers; and/or
a management system to automatically determine what information goes into the container based on tested probabilistic models. In this regard, the script for profiling the data may be performing classification bucketing of the data in the dataset. The classification can indicate confidence levels that data is sensitive, resulting in probabilistic models depending on the thresholds used and policies in play. Thresholds as to what is or is not sensitive information subject to the data residency restrictions can be set by, e.g., the customer.

Aspects can assist in internal analytics use cases across an organization's divisions, assist in external (client/customer) analytics use cases, and help maintain compliance.

In a particular example of server inventory, an automated analysis of the data can lead to automated DDL generation, which forms the basis of the input and output data volume contents in the container when the container is initialized. Specifically, the DDL can define data structures to hold the reformatted dataset in the container's output data volume.

Below is example DDL—the fact tables that may be auto-generated (some in input table, and some in output volume):

```
CREATE TABLE 'S_SPECTRE_AMS' (
'computer_id' varchar(100) DEFAULT NULL,
'computer_name' varchar(100) DEFAULT NULL,
'os' varchar(300) DEFAULT NULL,
'ip_addresses' varchar(3000) DEFAULT NULL,
'c_code' varchar(100) DEFAULT NULL,
'account_name' varchar(200) DEFAULT NULL,
'fixlet_id' bigint(20) DEFAULT NULL,
'fixlet_name' varchar(500) DEFAULT NULL,
'site_name' varchar(300) DEFAULT NULL,
'state' varchar(100) DEFAULT NULL,
'first_became_relevant' varchar(50) DEFAULT NULL,
'geo' varchar(50) DEFAULT NULL,
KEY 'IX1_S_SPECTRE_AMS' ('computer_name'),
KEY 'IX2_S_SPECTRE_AMS' ('account_name'),
KEY 'IX3_S_SPECTRE_AMS' ('os')
)
CREATE TABLE 'S_SPECTRE_SJC' (
'computer_id' varchar(100) DEFAULT NULL,
'computer_name' varchar(100) DEFAULT NULL,
'os' varchar(300) DEFAULT NULL,
'ip_addresses' varchar(3000) DEFAULT NULL,
'c_code' varchar(100) DEFAULT NULL,
'account_name' varchar(200) DEFAULT NULL,
'fixlet_id' bigint(20) DEFAULT NULL,
'fixlet_name' varchar(500) DEFAULT NULL,
'site_name' varchar(300) DEFAULT NULL,
'state' varchar(100) DEFAULT NULL,
'first_became_relevant' varchar(50) DEFAULT NULL,
'geo' varchar(50) DEFAULT NULL,
KEY 'IX1_S_SPECTRE_SJC' ('computer_name'),
KEY 'IX2_S_SPECTRE_SJC' ('account_name'),
KEY 'IX3_S_SPECTRE_SJC' ('os'),
KEY 'IX4_S_SPECTRE_SJC' ('geo')
)
CREATE TABLE 'S_PATCHES' (
'OS_FAMILY' varchar(200) DEFAULT NULL,
'OS_SUBCAT' varchar(1000) DEFAULT NULL,
'OS_TYPE' varchar(2000) DEFAULT NULL,
'OS_ARCH' varchar(200) DEFAULT NULL,
'FULL_OS_NAME' varchar(1000) DEFAULT NULL,
'MSS_ID' varchar(200) DEFAULT NULL,
'MSS_TITLE' varchar(500) DEFAULT NULL,
'MSS_URI' varchar(300) DEFAULT NULL,
'VENDOR_ID' varchar(200) DEFAULT NULL,
'CVE_NUM' varchar(3000) DEFAULT NULL,
'PACKAGES_LIST' varchar(3000) DEFAULT NULL,
KEY 'ossubcat_idx' ('OS_SUBCAT'),
KEY 'packages_idx' ('PACKAGES_LIST')
)
- - Dimensions
CREATE TABLE 'D_OS' (
'id' int(11) NOT NULL AUTO_INCREMENT,
'OS_FAMILY' varchar(100) DEFAULT NULL,
'OS_NAME' varchar(300) DEFAULT NULL,
'OS_VER_NUM' decimal(7,2) DEFAULT NULL,
'OS_VER_TEXT' varchar(90) DEFAULT NULL,
'LAST_UPDATED_DT' datetime DEFAULT CURRENT_TIMESTAMP ON UPDATE CURRENT_TIMESTAMP,
'PATCH_AVAIL' varchar(300) DEFAULT NULL,
'MSS_COUNT' smallint(6) DEFAULT NULL,
'CVE_2017_5715' smallint(6) DEFAULT NULL,
'CVE_2017_5753' smallint(6) DEFAULT NULL,
'CVE_2017_5754' smallint(6) DEFAULT NULL,
'CURATED_OS_NAME' varchar(300) DEFAULT NULL,
'OS_EDITION' varchar(100) DEFAULT NULL,
PRIMARY KEY ('id'),
KEY 'osname_idx' ('OS_NAME'),
KEY 'DOSIX_2' ('CURATED_OS_NAME';'PATCH_AVAIL')
) - - Fact private
CREATE TABLE 'F_INV_ALL_V4' (
'HostName' varchar(200) DEFAULT NULL,
'Geo' varchar(100) DEFAULT NULL,
'Client' varchar(500) DEFAULT NULL,
'OSType' varchar(300) DEFAULT NULL,
'OSVer' varchar(100) DEFAULT NULL,
'CuratedOS' varchar(100) DEFAULT NULL,
'OSMatching' varchar(200) DEFAULT NULL,
'OSID' int(11) NOT NULL DEFAULT '0',
'GEOID' int(11) NOT NULL DEFAULT '0',
'CLIENT_U' varchar(500) DEFAULT NULL,
'CLIENTID' bigint(20) DEFAULT NULL,
KEY 'INVMATCHV4_IX1' ('HostName'),
KEY 'INVMATCHV4_IX2' ('CuratedOS'),
KEY 'INVMATCHV4_IX3' ('OSMatching'),
KEY 'INVMATCHV4_IX4' ('Geo'),
KEY 'INVMATCHV4_IX5' ('Client' ,'GEOID'),
KEY 'INVMATCHV4_IX6' ('CLIENTID','GEOID'),
KEY 'INVALLV4_FKIX1' ('OSID'),
KEY 'INVALLV4_FKIX2' ('GEOID')
) - - Summary shared
CREATE TABLE 'F_SUMMARY_BY_GEO' (
'GEO_FAMILY' varchar(100) DEFAULT NULL,
'id' int(11) NOT NULL AUTO_INCREMENT,
'SERVER_COUNT' int(11) DEFAULT NULL,
'PATCH_AVAIL' varchar(300) DEFAULT NULL,
PRIMARY KEY ('id')
)
```

The above fact table "F_SUMMARY_BY_GEO" becomes an outcome of the analytics, and may be shared across restricted geographies. The data generated into this table (within the output volume) may be shareable. The data in the other tables, that represents a loading (and cleaning) of input data is not bound to the container. Therefore, the input data is no longer persisted after the container stops. The container can be configured in this regard such that, based on terminating the instantiated generated container, data of the input data volume is lost.

In this manner, the containers may be configured so that it is not necessary for the customer to dump data into a container volume. Instead, the data may be received into the input volume in a structured manner.

In some examples, the lifecycle of the output data volume is configured to outlast that of the container itself, for instance for auditability reasons, as one example.

Other generated artifacts can include the loading of data into a relational database (RDB) within a container:

```
load data local infile '/db/data/AMS_report-2018-04-16.15.58_01.csv' into table
S_SPECTRE_AMS FIELDS TERMINATED BY',' OPTIONALLY
ENCLOSED BY '"' (computer_id, computer_name, os, ip_addresses,
c_code, account_name, fixlet_id, fixlet_name, site_name, state, first_
became_relevant,geo);
load data local infile '/db/data/Spectre-MeltdownReport-SJC-04162018.csv'
into table S_SPECTRE_SJC FIELDS TERMINATED BY','
OPTIONALLY ENCLOSED BY '"';
```

In addition the generated artifacts can include scripts for sending the contents of the output volume back to the host/source of the data:

```
SELECT * FROM F_SUMMARY_BY_GEO INTO OUTFILE
'/data/infosec/summary_04172018.csv' FIELDS TERMINATED BY ','
ENCLOSED BY '"';
```

-continued

```
mysql -u gtscdo -p -h vm-4.gts-cdo.zc2.ibm.com -P 3306 load data local
infile /data/infosec/summpary_04172018.csv' into table F_SUMMARY_
BY_GEO FIELDS TERMINATED BY ',' OPTIONALLY ENCLOSED
BY "";
```

Figure 4:
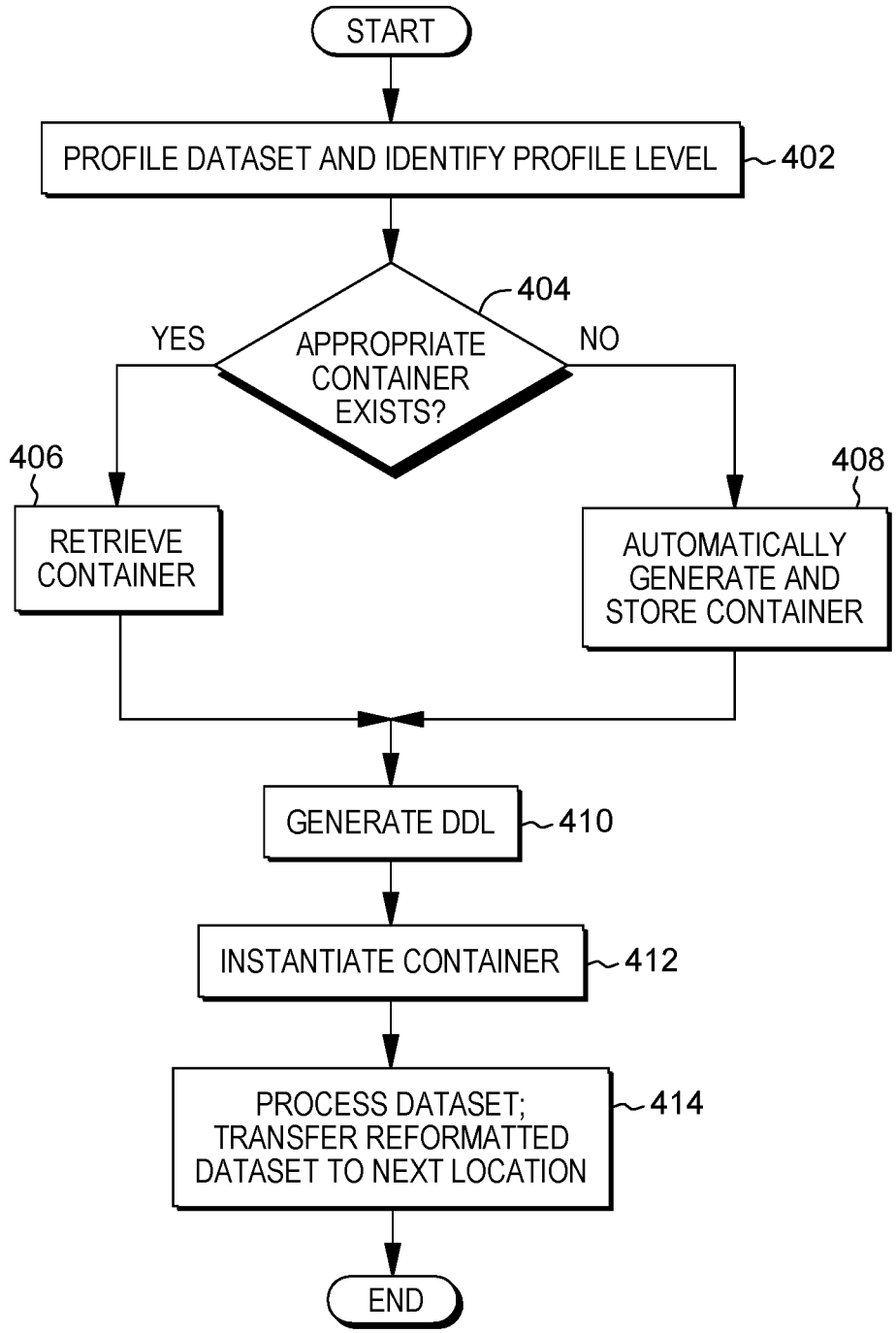
FIG. 4 depicts an example process for data security across data residency restriction boundaries, in accordance with aspects described herein.

FIG. 4 depicts an example process for data security across data residency restriction boundaries, in accordance with aspects described herein. In some examples, the process is performed by one or more computer systems (also referred to as data processing systems), such as those described herein, which may include a source system/server hosting or accessing a database, one or more cloud servers, and/or one or more other computer systems.

The process begins by profiling a dataset on which a desired analysis is to be performed (402). At least some results of the desired analysis are to be transferred from one location (e.g. a source location) to another location (e.g. a target location. The dataset is subject to data residency restrictions that restrict transfer of the dataset across a boundary to the another location. The profiling identifies a profile level for the dataset, which informs of the sensitivity of data of the dataset, and therefore processing and properties needed for the container. In a particular example, the profiling includes receiving a script by the data processing system and executing the script to perform the profiling and the identifying based on identifying the target location and based on the data residency restrictions that restrict the transfer of the dataset across the boundary.

In some examples, the profiled dataset includes personally identifiable information (PII). The profiling can classify personally identifiable information of the dataset and determine the profile level for the dataset based on the classified personally identifiable information. The reformatted dataset can have the personally identifiable information removed or aggregated, such that the reformatted dataset does not include the personally identifiable information.

The process continues by checking whether an appropriate container for processing the dataset into the reformatted dataset already exists in the registry (404). An appropriate container might already exist, and therefore generation of a new container may not be needed. If it is determined that an appropriate container exists (404, Y), then the process retrieves the container (406) for instantiation. Otherwise, the process automatically generates the container (408) based on the identified profile level for the dataset and the data residency restrictions that restrict the transfer of the dataset across the boundary. The container is for processing the dataset into the reformatted dataset, such as a report, that is not restricted by the data residency restrictions for transfer across the boundary to the another location. In some examples, the generated container specifies executable code and dependencies to process the dataset into the reformatted dataset.

The process stores the generated container in a container registry (408) for possible reused later, wherefrom the stored generated container is available for selection and instantiation on a container host.

The process continues by generating a data definition language (DDL) defining data structures to hold the reformatted dataset in the output data volume (410), and instantiating the generated container on a data processing system at the one location (412). As noted, the data processing system can include a server responsible for a database in which the dataset is stored.

The instantiated generated container can include an input data volume for storing the dataset and an output data volume for storing the reformatted dataset. The generated DDL can define the data structures that house data on the input and output volumes, to provide structure to the information.

The generating the container can configure the generated container such that, based on terminating the instantiated generated container, data of the input data volume is lost. Additionally or alternatively, generating the container can configure the generated container such that the instantiation of the generated container includes restrictions that prevent extraction of data from the input data volume out of the instantiated generated container.

Continuing with FIG. 4, the process processes the dataset into the reformatted dataset using the instantiated generated container, and transfers the reformatted dataset to the another location (414).

In some embodiments, the desired analysis of the initial dataset is to occur across multiple containers. The initial container can perform some of that analysis and produce the reformatted dataset as an intermediate result. Other results of the overall analysis are the results that other containers in the different locations can generate. Thus, the desired analysis of FIG. 4 is to be performed by processing across the one location and a plurality of additional locations of which the another location is a part, where a respective data processing system at each additional location of the plurality of additional locations is to analyze respective intermediate data (e.g. the dataset the respective data processing system receives from a sequentially-prior location) of the desired analysis. Respective data residency restrictions can apply to the intermediate data residing at the additional location and restrict transfer of the intermediate data from that additional location across a respective boundary to a sequentially-next additional location of the plurality of additional locations. In this situation, the process can automatically generate a respective container for each additional location of the plurality of additional locations, the generated respective container generated based on (i) an identified profile level of the intermediate data that is to reside at the additional location and on (ii) the data residency restrictions that restrict the transfer of the intermediate data to the next additional location. In other words, the process can generate a container for each location, and that generation is based on the intermediate data that is to reside there and based on the data residency restrictions that apply for that location. The generated respective container for each such location can be configured to: receive the intermediate data for processing at that additional location; process the intermediate data into a reformatted intermediate dataset that is not restricted for transfer across the boundary to the next additional location; and transfer, to the generated respective container for the next additional location, the reformatted intermediate dataset as the respective intermediate data for analysis at that next additional location.

Although various examples are provided, variations are possible without departing from a spirit of the claimed aspects.

Figure 5:
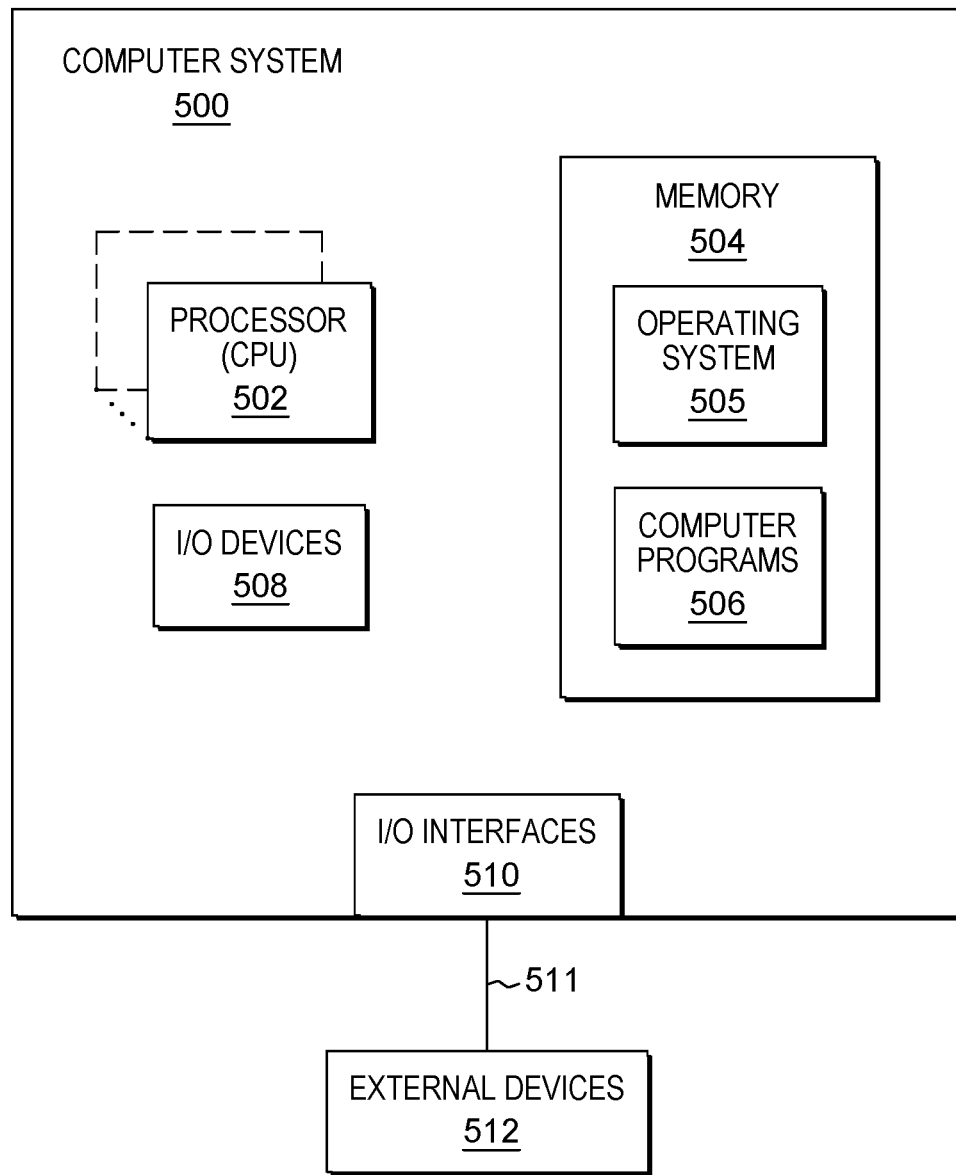
FIG. 5 depicts one example of a computer system and associated devices to incorporate and/or use aspects described herein.

Processes described herein may be performed singly or collectively by one or more computer systems, such as one or more database servers, cloud servers, or a combination of the foregoing, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA) or Intel Corporation (Santa Clara, Calif., USA), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
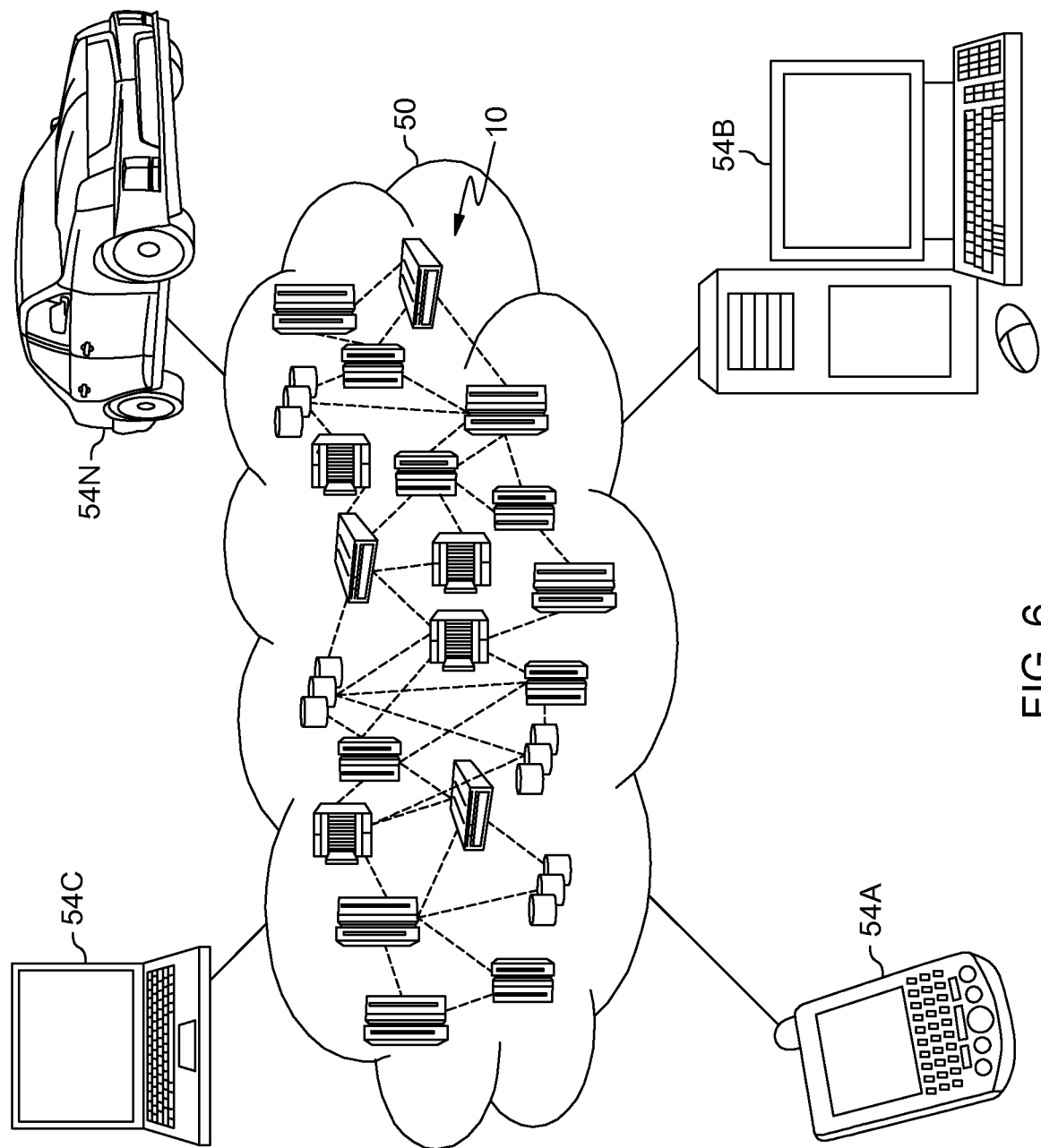
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
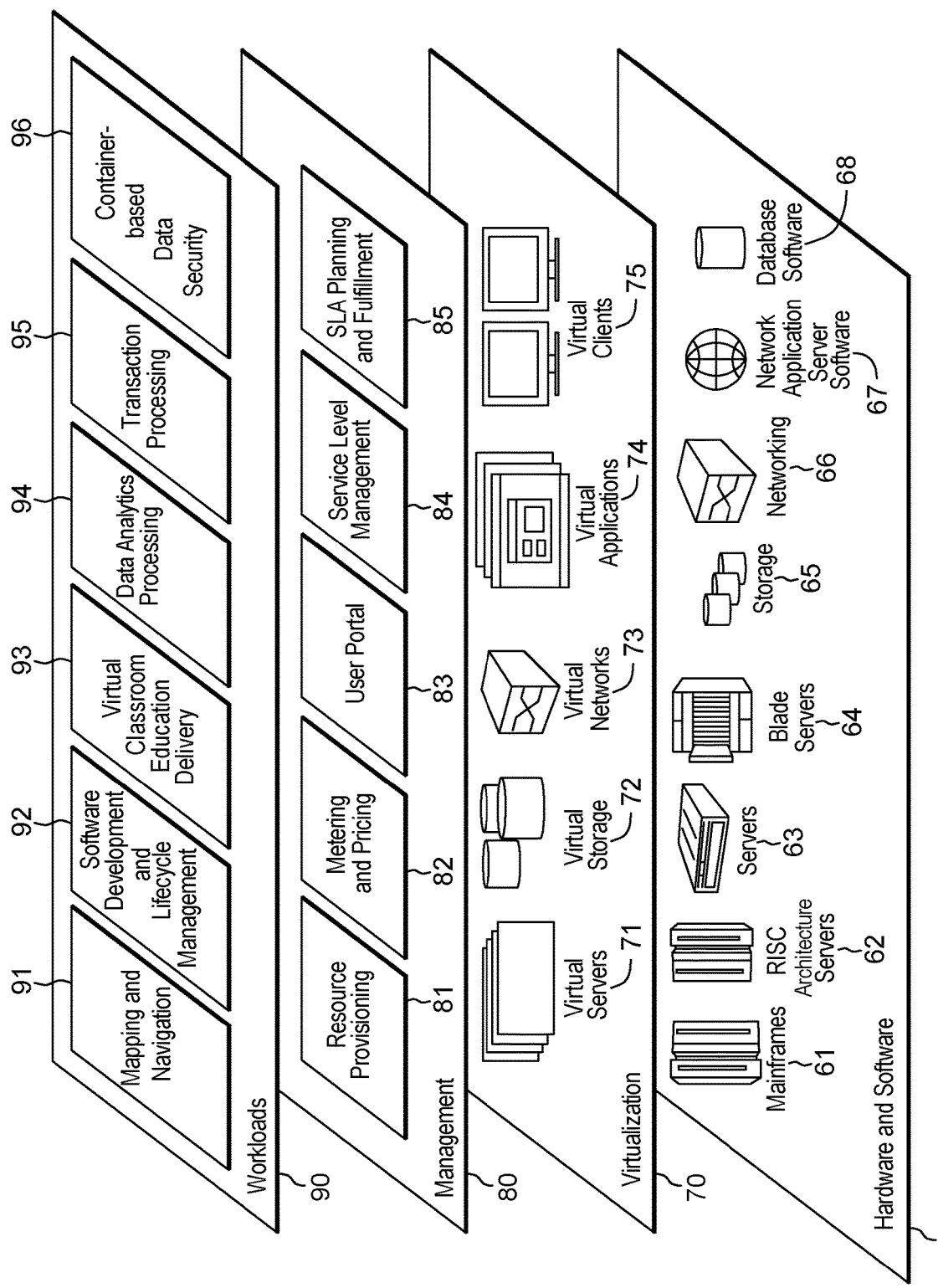
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container-based data security 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
profiling a dataset on which a desired analysis is to be performed, with at least some results of the desired analysis to be transferred from one location to another location, the dataset subject to data residency restrictions that restrict transfer of the dataset across a boundary to the another location, the profiling identifying a profile level for the dataset;
automatically generating and digitally storing a container image based on the identified profile level for the dataset and the data residency restrictions that restrict the transfer of the dataset across the boundary, the container image configured for instantiation and execution as a container on a container host, execution of the container providing a virtual environment having one or more software applications executing therein for processing the dataset into a reformatted dataset that is not restricted by the data residency restrictions for transfer across the boundary to the another location;
instantiating the generated container image on a data processing system at the one location, wherein the instantiating creates an instance of the container and commences execution of the container, the execution of the container comprising executing the one or more software applications; and
reformatting the dataset into the reformatted dataset using the instantiated generated container image, including the one or more software applications executing as part of the execution of the container to perform at least some of the reformatting, and transferring the reformatted dataset to the another location.

2. The method of claim 1, wherein the generated container image is digitally stored in a container registry wherefrom the container image is available for selection and instantiation on the container host.

3. The method of claim 2, further comprising checking whether an appropriate container for processing the dataset into the reformatted dataset already exists as a container image in the container registry, wherein the automatically generating the container image is performed based on determining that no appropriate container for processing the dataset into the reformatted dataset already exists as a container image in the registry.

4. The method of claim 1, wherein the container instantiated from the generated container image comprises an input data volume for storing the dataset and an output data volume for storing the reformatted dataset.

5. The method of claim 4, wherein the generating the container image configures the generated container image such that, based on terminating the container instantiated from the generated container image, data of the input data volume is lost.

6. The method of claim 5, wherein generating the container image configures the generated container image such that the instantiation of the generated container image includes restrictions that prevent extraction of data from the input data volume out of the container instantiated from the generated container image.

7. The method of claim 4, further comprising generating a data definition language defining data structures to hold the reformatted dataset in the output data volume.

8. The method of claim 1, wherein the data processing system comprises a server responsible for a database in which the dataset is stored, and wherein the method further comprises receiving a script by the data processing system and executing the script to perform the profiling and the identifying the profile level for the dataset based on identifying the another location and based on the data residency restrictions that restrict the transfer of the dataset across the boundary.

9. The method of claim 1, wherein the profiling classifies personally identifiable information of the dataset and determines the profile level for the dataset based on the classified personally identifiable information, and wherein the reformatted dataset has the personally identifiable information removed or aggregated, such that the reformatted dataset does not include the personally identifiable information.

10. The method of claim 1, wherein the generated container image specifies executable code and dependencies to process the dataset into the reformatted dataset, wherein the reformatting the dataset into the reformatted dataset comprises a portion of the desired analysis of the dataset, and wherein the reformatted dataset comprises the at least some results of the desired analysis for transfer to the another location.

11. The method of claim 1, wherein the desired analysis is to be performed by processing across the one location and a plurality of additional locations of which the another location is a part, wherein a respective data processing system at each additional location of the plurality of additional locations is to analyze respective intermediate data of the desired analysis, wherein respective data residency restrictions apply to the intermediate data residing at the additional location and restrict transfer of the intermediate data from that additional location across a respective boundary to a next additional location of the plurality of additional locations, and wherein the method further comprises:
  automatically generating a respective container image for each additional location of the plurality of additional locations, the generated respective container image generated based on (i) an identified profile level of the intermediate data that is to reside at the additional location and on (ii) the data residency restrictions that restrict the transfer of the intermediate data to the next additional location, the generated respective container image being configured for instantiation and execution as a respective container to:
    receive the intermediate data for processing at that additional location;
    process the intermediate data into a reformatted intermediate dataset that is not restricted for transfer across the boundary to the next additional location; and
    transfer, to the generated respective container for the next additional location, the reformatted intermediate dataset as the respective intermediate data for analysis at that next additional location.

12. A computer system comprising:
  a memory; and
  a processor in communication with the memory, wherein the computer system is configured to perform a method comprising:
    profiling a dataset on which a desired analysis is to be performed, with at least some results of the desired analysis to be transferred from one location to another location, the dataset subject to data residency restrictions that restrict transfer of the dataset across a boundary to the another location, the profiling identifying a profile level for the dataset;
    automatically generating and digitally storing a container image based on the identified profile level for the dataset and the data residency restrictions that restrict the transfer of the dataset across the boundary, the container image configured for instantiation and execution as a container on a container host, execution of the container providing a virtual environment having one or more software applications executing therein for processing the dataset into a reformatted dataset that is not restricted by the data residency restrictions for transfer across the boundary to the another location;
    instantiating the generated container image on a data processing system at the one location, wherein the instantiating creates an instance of the container and commences execution of the container, the execution of the container comprising executing the one or more software applications; and
    reformatting the dataset into the reformatted dataset using the instantiated generated container image, including the one or more software application executing as part of the execution of the container to perform at least some of the reformatting and transferring the reformatted dataset to the another location.

13. The computer system of claim 12, wherein the container instantiated from the generated container image comprises an input data volume for storing the dataset and an output data volume for storing the reformatted dataset.

14. The computer system of claim 13, wherein the method further comprises generating a data definition language defining data structures to hold the reformatted dataset in the output data volume.

15. The computer system of claim 12, wherein the data processing system comprises a server responsible for a database in which the dataset is stored, and wherein the method further comprises receiving a script by the data processing system and executing the script to perform the profiling and the identifying the profile level for the dataset based on identifying the another location and based on the data residency restrictions that restrict the transfer of the dataset across the boundary.

16. The computer system of claim 12, wherein the desired analysis is to be performed by processing across the one location and a plurality of additional locations of which the another location is a part, wherein a respective data processing system at each additional location of the plurality of additional locations is to analyze respective intermediate data of the desired analysis, wherein respective data residency restrictions apply to the intermediate data residing at the additional location and restrict transfer of the intermediate data from that additional location across a respective boundary to a next additional location of the plurality of additional locations, and wherein the method further comprises:
  automatically generating a respective container image for each additional location of the plurality of additional locations, the generated respective container image generated based on (i) an identified profile level of the intermediate data that is to reside at the additional location and on (ii) the data residency restrictions that restrict the transfer of the intermediate data to the next additional location, the generated respective container image being configured for instantiation and execution as a respective container to:

receive the intermediate data for processing at that additional location;

process the intermediate data into a reformatted intermediate dataset that is not restricted for transfer across the boundary to the next additional location; and transfer, to the generated respective container for the next additional location, the reformatted intermediate dataset as the respective intermediate data for analysis at that next additional location.

17. A computer program product comprising:

a computer readable storage medium readable by a processing circuit and storing instructions for execution by the processing circuit for performing a method comprising:

profiling a dataset on which a desired analysis is to be performed, with at least some results of the desired analysis to be transferred from one location to another location, the dataset subject to data residency restrictions that restrict transfer of the dataset across a boundary to the another location, the profiling identifying a profile level for the dataset;

automatically generating and digitally storing a container image based on the identified profile level for the dataset and the data residency restrictions that restrict the transfer of the dataset across the boundary, the container image configured for instantiation and execution as a container on a container host, execution of the container providing a virtual environment having one or more software applications executing therein for processing the dataset into a reformatted dataset that is not restricted by the data residency restrictions for transfer across the boundary to the another location;

instantiating the generated container image on a data processing system at the one location, wherein the instantiating creates an instance of the container and commences execution of the container, the execution of the container comprising executing the one or more software applications; and reformatting the dataset into the reformatted dataset using the instantiated generated container image, including the one or more software applications, executing as part of the execution of the container to perform at least some of the reformatting, and transferring the reformatted dataset to the another location.

18. The computer program product of claim 17, wherein the container instantiated from the generated container image comprises an input data volume for storing the dataset and an output data volume for storing the reformatted dataset, and wherein the method further comprises generating a data definition language defining data structures to hold the reformatted dataset in the output data volume.

19. The computer program product of claim 17, wherein the data processing system comprises a server responsible for a database in which the dataset is stored, and wherein the method further comprises receiving a script by the data processing system and executing the script to perform the profiling and the identifying the profile level for the dataset based on identifying the another location and based on the data residency restrictions that restrict the transfer of the dataset across the boundary.

20. The computer program product of claim 17, wherein the desired analysis is to be performed by processing across the one location and a plurality of additional locations of which the another location is a part, wherein a respective data processing system at each additional location of the plurality of additional locations is to analyze respective intermediate data of the desired analysis, wherein respective data residency restrictions apply to the intermediate data residing at the additional location and restrict transfer of the intermediate data from that additional location across a respective boundary to a next additional location of the plurality of additional locations, and wherein the method further comprises:

automatically generating a respective container image for each additional location of the plurality of additional locations, the generated respective container image generated based on (i) an identified profile level of the intermediate data that is to reside at the additional location and on (ii) the data residency restrictions that restrict the transfer of the intermediate data to the next additional location, the generated respective container image being configured for instantiation and execution as a respective container to:

receive the intermediate data for processing at that additional location;

process the intermediate data into a reformatted intermediate dataset that is not restricted for transfer across the boundary to the next additional location; and transfer, to the generated respective container for the next additional location, the reformatted intermediate dataset as the respective intermediate data for analysis at that next additional location.

* * * * *